United States Patent
Ahmed

(10) Patent No.: US 6,301,594 B1
(45) Date of Patent: Oct. 9, 2001

(54) METHOD AND APPARATUS FOR HIGH-SPEED EXPONENT ADJUSTMENT AND EXCEPTION GENERATION FOR NORMALIZATION OF FLOATING-POINT NUMBERS

(75) Inventor: Sadar U. Ahmed, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/267,935

(22) Filed: Mar. 11, 1999

(51) Int. Cl.⁷ .............. G06F 7/00; G06F 7/42; G06F 7/38
(52) U.S. Cl. ............ 708/205; 708/505; 708/495
(58) Field of Search ............ 708/204–205, 708/495–505

(56) References Cited

U.S. PATENT DOCUMENTS

| | | | |
|---|---|---|---|
| 4,779,220 | * 10/1988 | Nukiyama | 708/205 |
| 4,994,996 | * 2/1991 | Fossum et al. | 708/205 |
| 5,111,421 | * 5/1992 | Molnar et al. | 708/505 |
| 5,197,023 | * 3/1993 | Nakayama | 708/205 |
| 5,471,410 | * 11/1995 | Bailey et al. | 708/499 |
| 5,757,682 | * 5/1998 | Schwarz et al. | 708/205 |
| 5,923,574 | * 7/1999 | Bechade | 708/205 |
| 6,154,760 | * 11/2000 | Sharangpani | 708/205 |

* cited by examiner

*Primary Examiner*—Tan V. Mai
(74) *Attorney, Agent, or Firm*—Pennie & Edmonds LLP

(57) ABSTRACT

A method and circuit for adjusting an exponent of an unnormalized floating-point number to generate an exponent of a normalized floating-point number. The method includes the steps of: (1) generating a shift count indicating the number of bit positions, if any, a mantissa of an unnormalized floating-point number is to be left shifted to normalize the unnormalized floating-point number, (2) generating a right shift indicator indicating the number of bit positions, if any, the mantissa is to be right shifted to normalize the unnormalized floating-point number, (3) incrementing the value of an exponent of the unnormalized floating-point number, (4) concurrently with the incrementing step, complementing a plurality of bits of the shift count and (5) adding the exponent, the shift count and the right shift indicator to generate an exponent of a normalized floating-point number. The method and circuit may be implemented in a floating-point adder.

16 Claims, 4 Drawing Sheets

US 6,301,594 B1

METHOD AND APPARATUS FOR HIGH-SPEED EXPONENT ADJUSTMENT AND EXCEPTION GENERATION FOR NORMALIZATION OF FLOATING-POINT NUMBERS

BRIEF DESCRIPTION IF THE INVENTION

The present invention relates generally to floating-point number operations. More particularly, the present invention relates to exponent adjustment and exception generation for the normalization of floating-point numbers.

BACKGROUND OF THE INVENTION

In most operations on floating-point numbers, such as floating-point addition, the result of the operation is normalized. Normalizing a floating-point number involves shifting the mantissa until the most significant bit of the mantissa is nonzero. The exponent of the number is then adjusted accordingly by increasing or decreasing its value to compensate for the shifting of the mantissa. If the exponent adjustment causes an underflow or some other exceptional condition, an arithmetic exception is generated.

In a floating-point arithmetic circuit, such as a floating-point adder, the circuitry for normalizing the floating-point result (and associated arithmetic exception generation circuitry) typically contains a critical path that limits the speed of the arithmetic circuit. The critical path in the normalization circuitry usually includes a shift count detect circuit that generates a shift count (also called "norm count" ) indicating the number of bit positions that the mantissa of the floating-point result is to be shifted for normalization and an exponent adjustment circuit that adjusts the value of the exponent of the result based on the shift count. Because of its impact on the speed of a floating-point adder, it is important to minimize the delay of this critical path.

Various techniques have been used in the prior art to reduce the delay in generating the shift count, including the lead-zero-detection (LOD) and lead-zero-prediction (LOP) schemes. A detailed description of these techniques may be found in a number of references, including the background section of co-pending U.S. patent application Ser. No. 08/883,129, entitled "Norm-Count Detection Method of Floating Point Adder", which is incorporated herein by reference. The LOD and LOP schemes generate shift counts with a relatively small delay. However, since the shift count produced by these schemes is not exact, the exponent adjustment is only approximate. A second, final exponent adjustment is necessary to produce the exponent of the normalized number, thereby making the exponent adjustment circuit more complex and increasing the time required to generate the exponent of the normalized number.

In view of the shortcomings of these prior art normalization methods, it is an object of the present invention to minimize the delay incurred by exponent adjustment and exception generation for the normalization of floating-point numbers.

SUMMARY OF THE INVENTION

The present invention is a method and circuit for adjusting an exponent of an unnormalized floating-point number to generate an exponent of a normalized floating-point number. The method includes the steps of: (1) generating a shift count indicating the number of bit positions, if any, a mantissa of an unnormalized floating-point number is to be left shifted to normalize the unnormalized floating-point number, (2) generating a right shift indicator indicating the number of bit positions, if any, the mantissa is to be right shifted to normalize the unnormalized floating-point number, (3) incrementing the value of an exponent of the unnormalized floating-point number, (4) concurrently with the incrementing step, complementing a plurality of bits of the shift count and (5) adding the exponent, the shift count and the right shift indicator to generate an exponent of a normalized floating-point number.

The circuit of the present invention includes: (1) a shift count detector circuit to generate a shift count signal indicating the number of bit positions, if any, a mantissa of an unnormalized floating-point number is to be left shifted to normalize the unnormalized floating-point number, (2) a right shift detector circuit to generate a right shift signal indicating the number of bit positions, if any, the mantissa is to be right shifted to normalize the unnormalized floating-point number, (3) an incrementer circuit to increment the value of an exponent of the unnormalized floating-point number, (4) an inverting circuit coupled to the shift count detector circuit to complement a plurality of bits of the shift count signal and (5) an adder circuit coupled to the incrementer circuit, the inverting circuit and the right shift detector circuit to add the exponent, the shift count signal and the right shift signal to generate an exponent of a normalized floating-point number.

In a preferred embodiment of the present invention, the shift count/shift count signal is generated by performing an adding step and a rounding step concurrently. The shift count/shift count signal generated in this manner is produced relatively quickly and is thus called an "early" shift count/shift count signal.

The method and circuit of the present invention may be implemented in a floating-point adder. In these embodiments, the unnormalized floating-point number is the unnormalized result of either a floating-point addition operation or an integer-to-floating-point format conversion operation performed by the floating-point adder.

The method and circuit of the present invention reduces the time required to perform the exponent adjustment by minimizing the number of serially executed steps or critical path gate delays, respectively, used in the exponent adjustment process. The minimization of steps and gate delays in the exponent adjustment process is facilitated by the use of the early shift count/shift count signal.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
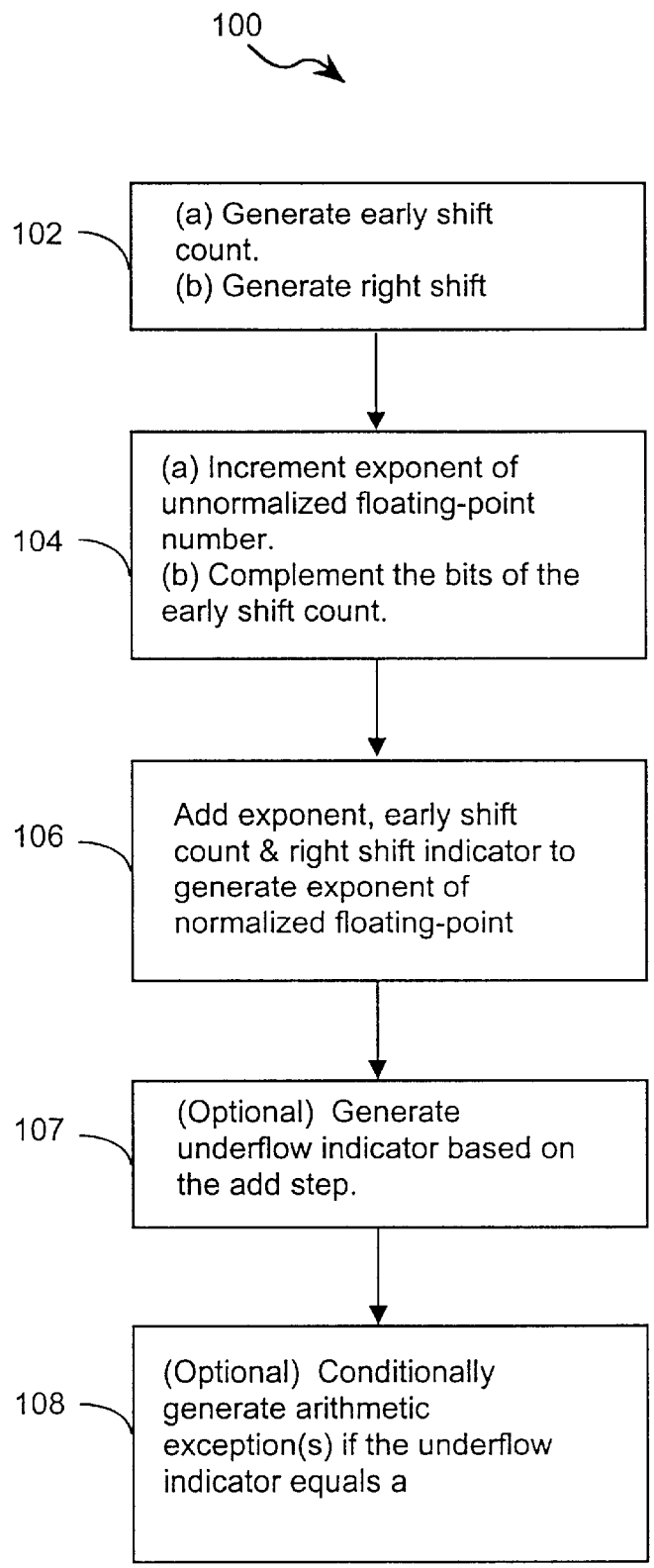
FIG. 1 is a flow chart showing the steps of a method for exponent adjustment and exception generation in accordance with an embodiment of the present invention.

FIG. 1 shows the steps of a method 100 for exponent adjustment and exception generation in accordance with an embodiment of the present invention. The exponent adjustment consists of adjusting an exponent of an unnormalized floating-point number to generate an exponent of a normalized floating-point number. The method 100 reduces the time required to perform the exponent adjustment by minimizing the number of serially executed steps used in the exponent adjustment process. As explained in more detail below, the number of serially executed steps is minimized in two ways: (1) by reducing the number of steps required for exponent adjustment by the use of an early shift count and (2) by performing some of the exponent adjustment steps in parallel.

In a preferred embodiment, the method 100 is executed by a floating-point adder compatible with the SPARC-V9 system architecture as described in the *SPARC-V9 Architecture Manual*, Sun Microsystems, Inc., Mountain View, Calif. (1994). In this embodiment, the unnormalized floating-point number is the unnormalized result of either a floating-point arithmetic operation or an integer-to-floating-point conversion operation performed by the floating-point adder. The method 100 handles three cases for normalizing the unnormalized floating-point number in this embodiment: (1) right shift the mantissa by 1 bit, (2) no shift of the mantissa and (3) left shift the mantissa by an amount equal to an early shift count.

The method 100 includes the following steps. First, generate an early shift count (step 102 (*a*)). The early shift count (also called "norm count") is an exact count of the number of bit positions, if any, that the mantissa of the unnormalized floating- point number is to be left shifted to normalize the floating-point number. The early shift count is "early" because it is generated significantly faster than exact shift count signals generated using prior art methods. The early shift count is generated by performing an adding step and a rounding step concurrently, as described in more detail in the above-mentioned U.S. patent application Ser. No. 08/883,129.

The use of the early shift count in the method 100 minimizes the number of steps required to perform the exponent adjustment. This is because the early shift count provides a fast yet exact shift count, thereby rendering unnecessary the steps used in the prior art LOD and LOP schemes for making final adjustments to the exponent of the normalized floating-point number.

Concurrently with step 102 (*a*), generate a right shift indicator (step 102 (*b*)). The right shift indicator indicates the number of bit positions, if any, the mantissa of the unnormalized floating-point number is to be right shifted to normalize the number. In a preferred embodiment of the present invention, the maximum number of bit positions that the mantissa is to be right shifted is one bit. Therefore, the right shift indicator is a 1-bit binary number that, for example, may be set to a logic value "1" to indicate a right shift of one bit or a logic value "0" to indicate no right shift.

Second, increment the exponent of the unnormalized floating-point number (step 104 (*a*)). Concurrently, complement the bits of the early shift count (step 104 (*b*)). As will be seen in the next step, the exponent is incremented and the early shift count is complemented to produce the two's complement of the early shift count. The increment and complement steps are performed concurrently to minimize the time required to produce the two's complement of the early shift count.

Third, add the incremented exponent, the complemented early shift count and the right shift indicator to generate the exponent of the normalized floating-point number (step 106). Since the two's complement of a number is produced by complementing the bits of the number and adding one, the two's complement of the early shift count is produced in this step by the addition of the incremented exponent and the complemented early shift count. Therefore, this step in effect adds the exponent and the right shift indicator and subtracts the early shift count to generate the exponent of the normalized floating-point number.

Table 1 shows the values of the incremented exponent, the complemented early shift count, the right shift indicator and the exponent of the normalized floating-point number produced by the method 100 for the three normalization cases of a preferred embodiment of the present invention.

TABLE 1

| Mantissa Shift Required for Normalization | Incremented Exponent of Unnormalized FP Number | Complemented Early Shift Count | Right Shift Indicator | Exponent of Normalized FP Number |
| --- | --- | --- | --- | --- |
| 1-bit right shift | unnorm. FP exp. + 1 | −1 | 1 | unnorm. FP exp. + 1 |
| no shift | unnorm. FP exp. + 1 | −1 | 0 | unnorm. FP exp. |
| left shift | unnorm. FP exp. + 1 | −(early shift count) − 1 | 0 | unnorm. FP exp. − early shift count |

Optionally, the method 100 may include the following additional steps for generating arithmetic exception(s) under certain conditions. First, generate an underflow indicator based on the add step 106 (step 107). The underflow indicator indicates whether the addition in step 106 caused an arithmetic underflow. Second, conditionally generate one or more arithmetic exception(s) if the underflow indicator equals a predetermined value (step 108). The arithmetic exceptions may comprise, for example, an unfinished trap or an inexact exception. The arithmetic exceptions are generated conditionally because they are generated only if additional conditions are present as well, as explained further below.

Figure 2:
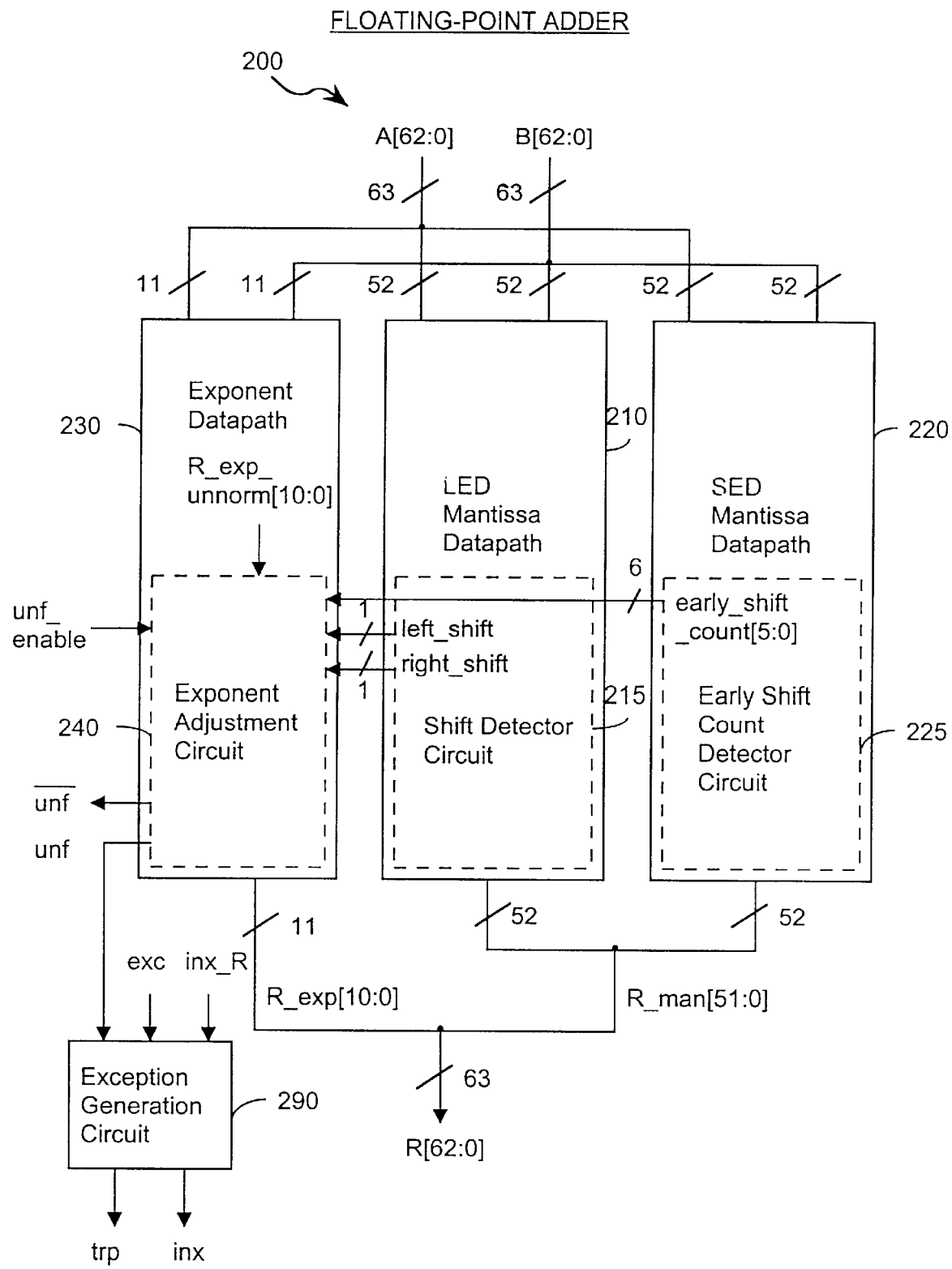
FIG. 2 is a block diagram of a floating-point adder in accordance with an embodiment of the present invention, including an exponent adjustment circuit and an exception generation circuit.

FIG. 2 shows a floating-point adder 200 in accordance with an embodiment of the present invention. The floating-point adder 200 may be integrated within a microprocessor or implemented as a discrete unit. The floating-point adder 200 performs two types of operations: (1) the addition of two floating-point operands A[63:0] and B[63:0] and (2) the conversion of a number between an integer format and a floating-point format. The floating-point adder 200 outputs a normalized double-precision floating-point result R[63:0]. In a double-precision implementation, the format of the floating-point numbers A, B and R are as follows:

| 63 | 62     52 | 51                       0 |
| --- | --- | --- |
| sign (1 bit) | exponent (11 bits) | mantissa (52 bits) |

In a preferred embodiment, the floating-point adder 200 is implemented in accordance with the above-mentioned SPARC-V9 system architecture, which complies with the IEEE 754 floating-point standard.

The floating-point adder 200 implements the steps of the above-described method 100 for exponent adjustment and exception generation. Like the method 100, the floating-point adder 200 in a preferred embodiment handles three cases for normalizing an unnormalized floating-point number: (1) right shift the mantissa by 1 bit, (2) no shift of the mantissa and (3) left shift the mantissa by an amount equal to an early shift count.

The floating-point adder 200 includes a Large Exponent Difference (LED) mantissa datapath 210, a Small Exponent Difference (SED) mantissa datapath 220, an exponent datapath 230 and optionally, an exception generation circuit 290. Since the concept of LED and SED mantissa datapaths is generally known in the art, the description of the mantissa datapaths will be limited to those aspects directly pertinent to the present invention. The LED and SED mantissa datapaths 210 and 220 each receive the mantissas A[51:0] and B[51:0] and generate the 52-bit mantissa R_man[51:0] of the result R. The LED mantissa datapath 210 operates on floating-point operands whose exponents differ by an amount greater than one. The SED mantissa datapath 220 operates on floating-point operands whose exponents differ by one or less.

The LED mantissa datapath 210 includes a shift detector circuit 215 for generating the signals left_shift and right shift. The left_shift signal indicates the number of bit positions, if any, the mantissa of an unnormalized floating-point result generated by the floating-point adder 210 or 220 is to be left shifted to normalize the result. The SED mantissa datapath 220 is used only where the operand exponents differ by one or zero. Therefore, the maximum number of bit positions that the mantissa is to be left shifted is specified by the early shift count [5:0]. The shift detector circuit 215 thus implements step 102 (a) of the method 100 for the SED case.

The right_shift signal or the left_shift signal indicates the number of bit positions, if any, the mantissa of the unnormalized floating-point result R_unnorm is to be right shifted or left shifted to normalize the result. Thus, the shift detector circuit 215 also implements step 102(b) of the method 100. Since the LED mantissa datapath 210 is used only where the operand exponents differ by an amount of more than one, the maximum number of bit positions that the mantissa is to be shifted is one bit. Therefore, the right_shift signal or the left_shift signal is a one-bit binary signal that, for example, may be set to a logic value "1" to indicate a right shift of one bit or a logic value "0" to indicate no right shift.

The SED mantissa datapath 220 includes an early shift count detector circuit 225 for generating an early_shift count signal. Like the left_shift signal, the early_shift_count signal indicates the number of bit positions, if any, the mantissa of the floating-point result R is to be left shifted to normalize the result. As mentioned before, the early_shift count signal is "early" because it is generated significantly faster than exact shift count signals generated using prior art methods. The early shift count detector circuit 225 used to generate the early_shift count signal is described in the above-mentioned U.S. patent application Ser. No. 08/883, 129. Since the SED mantissa datapath 220 is used where the operand exponents differ by one or less, the number of bit positions that the mantissa must be left shifted may be greater than one. In a preferred embodiment of the present invention, the maximum number of bit positions that the mantissa is to be left shifted is 53 bits. Therefore, the early_shift_count signal contains six bits. The early shift count detector circuit 225 thus implements step 102(a) of the method 100 for the LED case.

The exponent datapath 230 receives the exponents A[62:52] and B[62:52] to generate the 11-bit exponent R_exp[10:0] of the result R. The exponent datapath 230 includes an exponent adjustment circuit 240 that adjusts an exponent R_exp_unnorm[10:0] of the unnormalized floating-point result R_unnorm to generate the exponent R_exp[10:0] of the normalized result R. The exponent adjustment circuit 240 also generates an underflow signal unf and its complement unf that indicates whether the exponent adjustment caused an arithmetic underflow. The exponent adjustment circuit 240 thus implements steps 104–107 of the method 100. An underflow enable signal unf_enable is input to the exponent adjustment circuit 240 to selectively enable or disable the outputs of the exponent adjustment circuit, as explained further below.

The optional exception generation circuit 290 generates arithmetic exception signals, including an unfinished trap signal and an invalid exception signal, based on the value of the underflow signal unf. The exception generation circuit 290 thus implements step 108 of the method 100.

Figure 3:
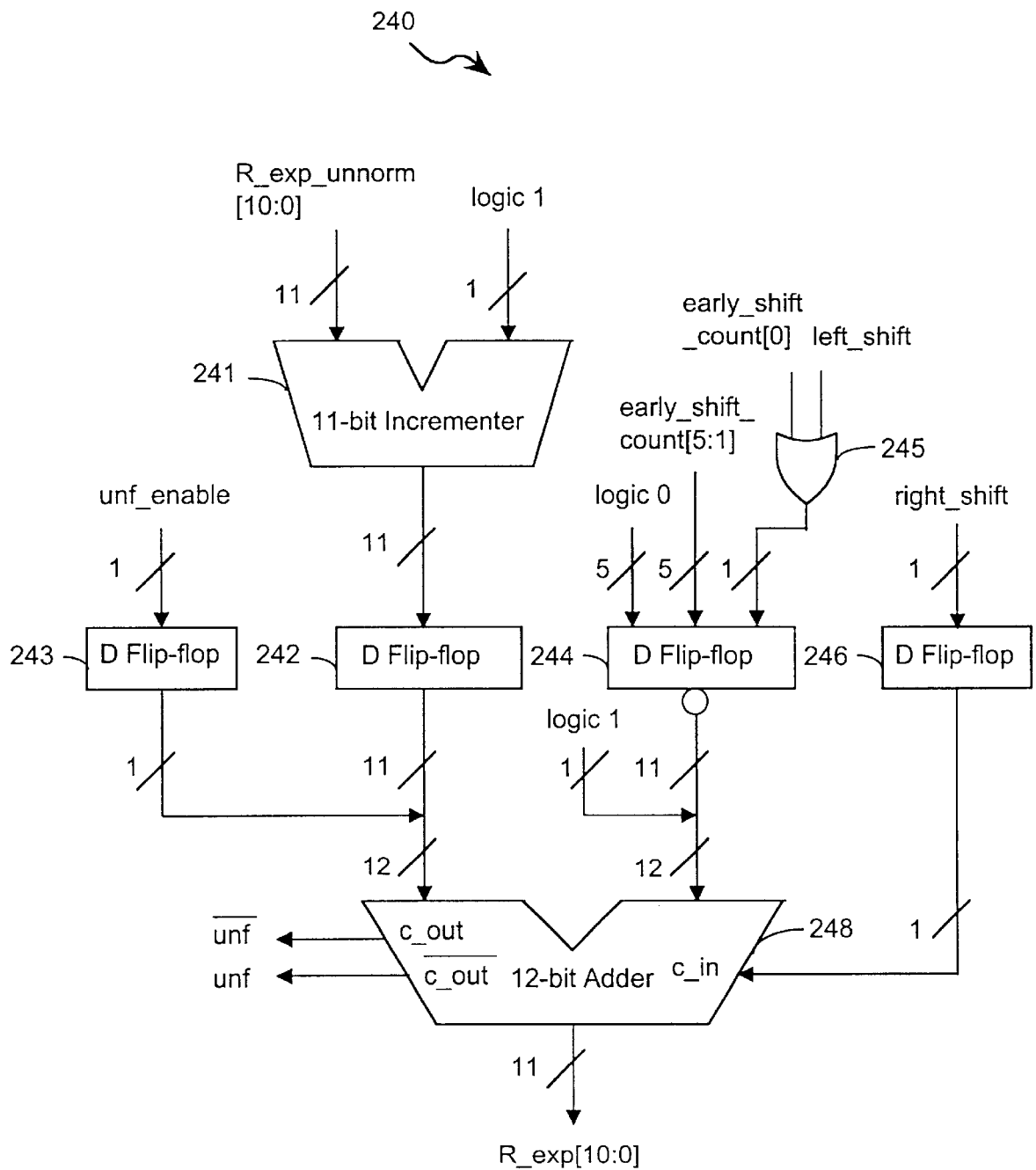
FIG. 3 is a circuit diagram for the exponent adjustment circuit shown in FIG. 2.

FIG. 3 is a circuit diagram for the exponent adjustment circuit 240. As mentioned earlier, the exponent adjustment circuit 240 implements steps 104–107 of the method 100 by adjusting the exponent R_exp_unnorm[10:0] of the unnormalized floating-point result R_unnorm to generate the exponent R_exp[10:0] of the normalized result R. The exponent adjustment circuit 240 reduces the time required to perform the exponent adjustment by minimizing the number of gate delays in the critical path for generating the exponent R_exp of the normalized floating-point result R. As explained in more detail below, the critical path delay for the exponent adjustment circuit 240 is minimized in two ways: (1) by reducing the number of multiplexers and other circuit elements required for exponent adjustment by the use of the early_shift_count signal and (2) by performing some of the exponent adjustment steps in parallel.

The exponent adjustment circuit 240 includes an incrementer circuit 241 to increment the value of the exponent R_exp_unnorm[10:0] of the unnormalized floating-point result R_unnorm. The incrementer circuit 241 thus implements step 104(a) of the method 100. In a preferred embodiment, the incrementer circuit 241 comprises an 11-bit adder with one of the inputs hardwired to the logic value "1". The output of the incrementer circuit 241 is latched by a D flip-flop circuit 242.

The exponent adjustment circuit 240 also includes an inverting circuit 244 to complement the bits of one of the two shift count signals, left_shift or early_shift_count [5:0]. An OR gate 245 and circuitry (not shown) in the inverting circuit 244 is used to select the shift count signal to be complemented. The inverting circuit 244 thus implements step 104(b) of the method 100. In a preferred embodiment, the inverting circuit 244 comprises a D flip-flop circuit with inverted outputs, thereby providing a latched output.

The use of the early_shift_count signal by the exponent adjustment circuit 240 minimizes the number of gate delays in the critical path for generating the exponent R_exp of the normalized result R. This is because the early_shift_count signal provides a fast yet exact shift count, thereby rendering unnecessary the multiplexers and other circuitry used by the prior art LOD and LOP schemes to make final adjustments to the exponent R_exp.

Observe that the incrementer circuit 241 and inverting circuit 244 are independent, parallel circuits in the exponent adjustment circuit 240. This parallel arrangement is used so that the incrementing and complementing steps of the method 100 are performed concurrently to minimize the time required to produce the two's complement of the early_shift_count signal.

The exponent adjustment circuit 240 additionally includes the D flip-flop circuits 243 and 246 for latching the signals unf_enable and right_shift, respectively. The latched unf_enable signal is concatenated to the incremented exponent R_exp_unnorm as the most significant bit to selectively enable or disable an adder in the exponent adjustment circuit 240, as explained next.

Lastly, the exponent adjustment circuit 240 includes a 12-bit adder circuit 248 to add the incremented exponent R_exp_unnorm, the complemented early_shift count signal and the right_shift signal to generate the 11-bit exponent R_exp[10:0]. The adder circuit 248 is 12 bits wide to receive the unf enable signal, which is used to selectively enable or disable the adder in a manner that is known in the art. In a preferred embodiment, the adder circuit 248 includes the outputs carry out c_out and its complement $\overline{c\_out}$. The $\overline{c\_out}$ output is used to generate the underflow signal unf. The adder circuit 248 thus implements steps 106 and 107 of the method 100.

Table 2 shows the values of the input and output signals for the adder circuit 248 for each of the normalization cases of a preferred embodiment of the present invention.

TABLE 2

| Mantissa Shift Required for Normalization | Inputs to Adder Circuit 248 | | | Output of Adder Circuit 248 R_exp |
|---|---|---|---|---|
| | Incremented R_exp_unnorm | Complemented early_shift_count/left_shift | right_shift | |
| 1-bit right shift | R_exp_unnorm + 1 | −1 | 1 | R_exp_unnorm + 1 |
| no shift | R_exp_unnorm + 1 | −1 | 0 | R_exp_unnorm |
| left shift | R_exp_unnorm + 1 | −(early_shift_count) − 1 | 0 | R_exp_unnorm − early_shift_count |

Figure 4:
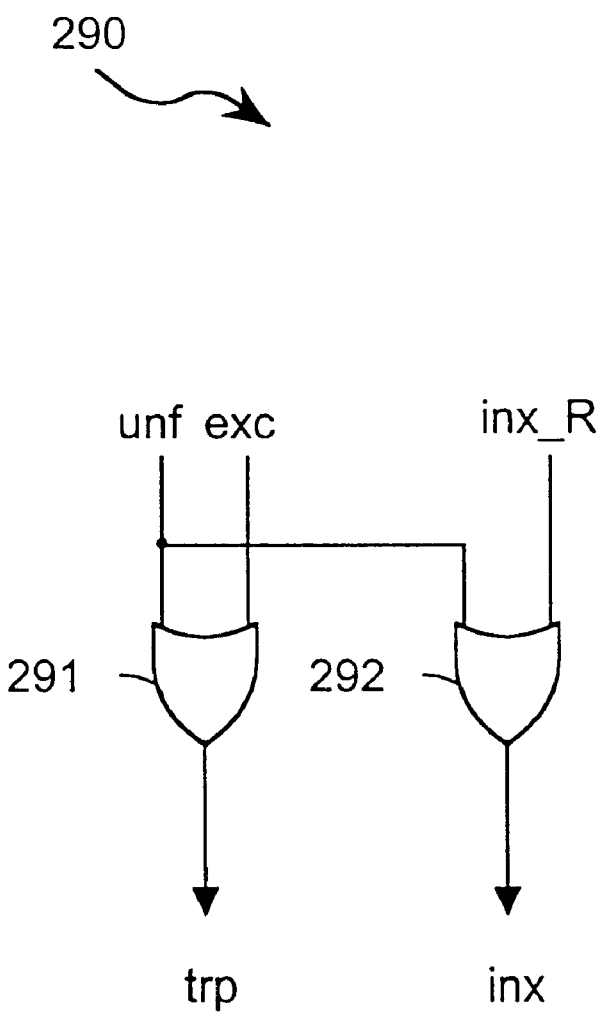
FIG. 4 is a circuit diagram for the exception generation circuit shown in FIG. 2.

FIG. 4 is a circuit diagram for the exception generation circuit 290. The exception generation circuit 290 generates the arithmetic exception signals trp and inx. The unfinished trap signal trp is asserted to invoke an unfinished trap for the floating-point result R. The inexact exception signal inx is asserted to indicate an inexact exception for the result R. The exception generation circuit 290 is compatible with the SPARC-V9 system architecture and the IEEE 754 floating-point standard.

The exception generation circuit 290 includes two two-input OR gates 291 and 292 (or their logical equivalent). The OR gate 291 logically ORs the underflow signal unf generated by the exponent adjustment circuit 240 and a signal exc to generate the unfinished trap signal trp. The input signal exc, which is generated with circuitry (not shown) external to the floating-point adder 200, is asserted to indicate any of following exceptional conditions that occurred when generating the result R: denormal, overflow, or all-zero exponent R_exp. The OR gate 292 logically ORs the underflow signal unf and a signal inx_R to generate the inexact exception signal inx. The input signal inx_R which is generated with circuitry (not shown) external to the floating-point adder 200, is asserted to indicate that the result R is inexact.

The exception generation circuit 290 is designed to minimize the time required to generate the arithmetic exception signals trp and inx. The exception generation circuit 290 achieves this objective in two ways: (1) by the use of the relatively fast exponent adjustment circuit 240 to generate the underflow signal unf, from which the trp and inx signals are derived, and (2) by minimizing the number of gate delays in the critical paths for generating the trp and inx signals. The critical path delays are minimized by placing only a single two-input gate (OR gate 291 or 292 ) in the paths between the unf signal input and the trp and inx signal outputs. As a result, the exception generation circuit 290 minimizes the time required to generate the exception signals trp and inx.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method for adjusting an exponent of an unnormalized floating-point number to generate an exponent of a normalized floating-point number, comprising the steps of:

generating a shift count indicating the number of bit positions, if any, a mantissa of an unnormalized floating-point number is to be left shifted to normalize said unnormalized floating-point number;

generating a right shift indicator indicating the number of bit positions, if any, said mantissa is to be right shifted to normalize said unnormalized floating-point number;

incrementing the value of an exponent of said unnormalized floating-point number;

complementing a plurality of bits of said shift count to produce a complemented shift count; and adding said exponent, said complemented shift count and said right shift indicator to generate an exponent of a normalized floating-point number.

2. The method of claim 1, wherein said shift count generating step includes the step of generating said shift count by performing an adding step and a rounding step.

3. The method of claim 1, wherein said shift count generating step includes the steps of:

generating a first shift count;

generating a second shift count having a value larger than the value of said first shift count; and selecting one of said first and second shift counts as said shift count.

4. The method of claim 1, wherein said right shift indicator comprises a 1-bit binary number that is set to either a first value that indicates said mantissa is to be right shifted by one bit position or a second value that indicates said mantissa is not to be right shifted.

5. The method of claim 1, wherein:

said method is performed as part of a floating-point addition operation; and said unnormalized floating-point number is an unnormalized result of said floating-point addition operation.

6. The method of claim 1, wherein:

said method is performed as part of an integer-to-floating-point format conversion operation; and said unnormalized floating-point number is an unnormalized result of said format conversion operation.

7. The method of claim 1, further comprising the steps of:

generating an underflow-indicator based on said adding step; and generating an arithmetic exception if said underflow indicator equals a predetermined value.

8. A circuit for adjusting an exponent of an unnormalized floating-point number to generate an exponent of a normalized floating-point number, comprising:

a shift count detector circuit to generate a shift count signal indicating a number of bit positions, if any, a mantissa of an unnormalized floating-point number is to be left shifted to normalize said unnormalized floating-point number;

a right shift detector circuit to generate a right shift signal indicating a number of bit positions, if any, said mantissa is to be right shifted to normalize said unnormalized floating-point number;

an incrementer circuit to increment the value of an exponent of said unnormalized floating-point number;

an inverting circuit coupled to said shift count detector circuit to complement a plurality of bits of said shift count signal to form an inverted shift count signal; and an adder circuit coupled to said incrementer circuit, said inverting circuit and said right shift detector circuit to add said exponent, said inverted shift count signal and said right shift signal to generate an exponent of a normalized floating-point number.

9. The circuit of claim 8, wherein said shift count detector circuit includes circuitry for generating said shift count signal that performs an adding step and a rounding step.

10. The circuit of claim 8, wherein:

said shift count detector circuit includes a first shift detector circuit for generating a first shift count and a second shift detector circuit for generating a second shift count having a value larger than the value of said first shift count; and said inverting circuit receives said first and second shift counts and includes a selection circuit for selecting one of said first and second shift counts as said shift count.

11. The circuit of claim 8, wherein said right shift signal comprises a 1-bit binary signal that is set to either a first value that indicates said mantissa is to be right shifted by one bit position or a second value that indicates said mantissa is not to be right shifted.

12. The circuit of claim 8, wherein:

said circuit is part of a floating-point adder; and said unnormalized floating-point number is an unnormalized result of a floating-point addition operation performed by said floating-point adder.

13. The circuit of claim 8, wherein:

said circuit is part of a floating-point adder; and said unnormalized floating-point number is an unnormalized result of an integer-to-floating-point format conversion operation performed by said floating-point adder.

14. The circuit of claim 8, wherein said adder circuit also generates a carry out signal for indicating an arithmetic exception condition.

15. A floating-point adder for generating a normalized floating-point result, comprising:

(1) a mantissa datapath, including:

a shift count detector circuit to generate a shift count signal indicating the number of bit positions, if any, a mantissa of an unnormalized floating-point result is to be left shifted to normalize said unnormalized floating-point result; and a right shift detector circuit to generate a right shift signal indicating the number of bit positions, if any, said mantissa is to be right shifted to normalize said unnormalized floating-point result; and (2) an exponent datapath, including:

an incrementer circuit to increment the value of an exponent of said unnormalized floating-point result;

an inverting circuit coupled to said shift count detector circuit to complement a plurality of bits of said shift count signal; and an adder circuit coupled to said incrementer circuit, said inverting circuit and said right shift detector circuit to add said exponent, said shift count signal and said right shift signal to generate an exponent of a normalized floating-point result.

16. The floating-point adder of claim 15, wherein:

said adder circuit in said exponent datapath also generates a carry out signal; and said floating-point adder further includes an exception generation circuit for generating an arithmetic exception if said carry out signal equals a predetermined value.

* * * * *